(12) United States Patent
Miedler et al.

(10) Patent No.: US 12,115,902 B2
(45) Date of Patent: Oct. 15, 2024

(54) METHOD FOR RESOLUTION-OPTIMIZED CONTROL OF A MOTOR VEHICLE LIGHT MODULE

(71) Applicant: ZKW Group GmbH, Wieselburg (AT)

(72) Inventors: Stefan Miedler, Unterradlberg (AT); Clemens Aigner, St. Pölten (AT); Erik Haas, Rabenstein an der Pielach (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/397,838

(22) Filed: Dec. 27, 2023

(65) Prior Publication Data

US 2024/0217426 A1    Jul. 4, 2024

(30) Foreign Application Priority Data

Dec. 28, 2022   (EP) .................................... 22216976

(51) Int. Cl.
| | |
|---|---|
| *F21S 41/63* | (2018.01) |
| *B60Q 1/14* | (2006.01) |
| *G09G 3/00* | (2006.01) |
| *B60Q 11/00* | (2006.01) |

(52) U.S. Cl.
CPC ........... *B60Q 1/1415* (2013.01); *G09G 3/001* (2013.01); *B60Q 11/005* (2013.01)

(58) Field of Classification Search
CPC ...... F21S 41/635; F21S 41/663; F21S 41/153; B60Q 1/415; B60Q 11/005; G09G 3/001
See application file for complete search history.

(56) References Cited

U.S. PATENT DOCUMENTS

| | | | |
|---|---|---|---|
| 10,596,965 B2* | 3/2020 | Smith | H04N 7/183 |
| 2022/0400238 A1* | 12/2022 | Kim | H04N 9/3194 |
| 2024/0011616 A1* | 1/2024 | Winkler | F21S 41/265 |
| 2024/0166122 A1* | 5/2024 | Owada | B60Q 1/08 |

FOREIGN PATENT DOCUMENTS

DE    102016223227 A1    5/2018

OTHER PUBLICATIONS

Extended European Search Report for European Patent Application No. 22216976.5 dated Jun. 19, 2023 (9 Pages).
Sing, et al., "Super Resolution Projection: Leveraging the MEMS Speed to Double or Quadruple the Resolution," SPIE Proceedings, Mar. 4, 2019.

* cited by examiner

*Primary Examiner* — Dennis P Joseph
(74) *Attorney, Agent, or Firm* — Eversheds Sutherland (US) LLP

(57) ABSTRACT

A method for resolution-optimized control of a motor vehicle light module, wherein the motor vehicle light module is designed to emit segmented light distribution, wherein the motor vehicle light module includes a deflection unit, with which a native resolution of the motor vehicle light module can be visually increased by at least temporary beam deflection by means of the deflection unit, wherein the method includes a) receiving an image signal (S1), wherein the image signal (S1) contains a setpoint image (Ssoll) of light distribution, b) converting the setpoint image (Ssoll) received according to step a) into two lower-resolution images (S_low1, S_low2), and c) controlling the motor vehicle light module, wherein it is controlled in such a way that the two low-resolution images (S_low1, S_low2) of the image pair (S_res) are emitted one after the other by the motor vehicle light module.

15 Claims, 9 Drawing Sheets

$$\Delta y = t\sin\theta \left(1 - \sqrt{\frac{1 - \sin^2\theta}{n^2 - \sin^2\theta}}\right)$$

METHOD FOR RESOLUTION-OPTIMIZED CONTROL OF A MOTOR VEHICLE LIGHT MODULE

CROSS-REFERENCE TO RELATED APPLICATIONS

This application claims priority to European Patent Application No. 22216976.5, filed Dec. 28, 2022, which is incorporated herein by reference.

FIELD OF THE INVENTION AND DESCRIPTION OF PRIOR ART

The invention relates to a method for resolution-optimized control of a motor vehicle light module, wherein the motor vehicle light module is designed to emit segmented light distribution. Methods for controlling motor vehicle light modules have become known from the prior art, which enable a time-variable change in the light emission of individual segments of light distribution. The resolution is usually limited by the resolution of the motor vehicle light module in question.

SUMMARY OF THE INVENTION

In order to improve the light emission, the components of the motor vehicle light module in question have so far been modified, for example by using components that enable better resolution, improved contrast, increased light intensities and so on.

One object of the invention involves providing a method which can be used to further improve the light emission of a motor vehicle light module for emitting segmented light distribution.

This object is achieved with a method of the type mentioned in the introduction by virtue of the fact that the motor vehicle light module comprises a deflection unit, with which a native resolution of the motor vehicle light module can be visually increased by at least temporary beam deflection by means of the deflection unit, wherein the method comprises the following steps:
  a) receiving an image signal, wherein the image signal contains a setpoint image of light distribution, wherein the setpoint image has a resolution, which exceeds the native resolution of the motor vehicle light module,
  b) converting the setpoint image received according to step a) into two lower-resolution images, which together form an image pair, wherein the lower-resolution images are selected in such a way that they respectively have the native resolution of the motor vehicle light module, wherein the lower-resolution images are also matched to each other in such a way that at least one of the two lower-resolution images is deflected by means of the deflection unit such that the superimposition of the two lower-resolution images produces an image impression more similar to the setpoint image than the reproduction of the two low-resolution images on their own,
  c) controlling the motor vehicle light module, wherein it is controlled in such a way that the two low-resolution images of the image pair are emitted one after the other by the motor vehicle light module.

The expression "native resolution" is understood to mean any resolution that is achieved by the sum of the individually controllable segments for light emission. If, for example, the segments are arranged in two rows and two columns and are individually controllable, this corresponds to a native resolution of 2×2, wherein each individually controllable segment can also be referred to as a light pixel. The motor vehicle light module preferably has a native resolution of at least 2×2; it is particularly preferably a high-resolution motor vehicle light module.

The resolution that is perceived by the human eye can be increased compared to the native resolution by the at least temporary beam deflection by means of the deflection unit.

The expression "wherein the image signal contains a setpoint image of light distribution" should be understood as meaning that the image signal in any case contains information with which the setpoint image can be reproduced.

It should be mentioned that the setpoint image can also be split into more than two lower-resolution images. Splitting the setpoint image into a "section" of three or more images is also conceivable—in this way, several image pairs are formed. In addition, both lower-resolution images can be affected by the deflection by means of the deflection unit. In terms of the issue of the similarity of images, a person skilled in the art is familiar with suitable algorithms for assessment. For example, the mutual information (see, for example, keyword "mutual information", for which term there is also extensive information online, including in the online encyclopaedia "Wikipedia").

In particular, it can be provided that the motor vehicle light module has individually controllable light pixels, wherein the light distribution is segmented by the individually controllable light pixels, which are arranged next to each other in a matrix with a resolution of at least two rows and two columns, substantially without gaps.

It can further be provided that a maximum deflection carried out by the deflection unit is designed such that compared to a non-deflected reference state, the deflected state has a vertical and a horizontal offset of half a pixel width such that when the maximum amplitude of the deflection is reached—with the exception of edge pixels—each deflected light pixel spatially overlaps four non-deflected light pixels by 25% each. The perceived resolution can thus be four times the native resolution. An edge pixel is understood as a light pixel that is not surrounded on all sides by further light pixels, but is free of adjacent light pixels at least on its side. It thus constitutes an edge region of the image to be emitted.

In particular, it can be provided that the deflection unit has a neutral position, which the deflection unit automatically assumes in the event of a failure of a power supply to the deflection unit or of a control variable provided for controlling the deflection unit. A neutral position is understood as any position of the deflection unit in which no electrical voltage is applied to the deflection unit. This position can, but does not have to, differ from a zero position in which the deflection unit does not cause any substantial deflection of the light passing through the deflection unit. In the event that the actuator is not required or has to be switched off, this ensures that the light function continues to be output.

It can further be provided that an algorithm is provided for checking the correct calculation and output of the control variable, wherein if a malfunction is detected, the deflection unit is moved to the neutral position.

In particular, it can be provided that before or during step b), the following additional sub-steps are carried out:
  I) receiving a setpoint operating signal, wherein the setpoint operating signal contains information on at least one of the following criteria: setpoint image sharpness; setpoint energy efficiency; setpoint temperature; setpoint clarity; offset correction;

II) calculating control parameters that can be derived therefrom to influence a control variable provided for controlling the deflection unit.

If necessary, the calculation of the low-resolution images can also be adapted, for example if the amplitude is reduced such that the offset between the low-resolution images is reduced and the boundary conditions change when the two images are superimposed.

The information of the setpoint image can also contain information about the setpoint light intensity of the individual pixels of the image. This information can be passed on to the light source of the motor vehicle light module and implemented by it.

It can further be provided that a sub-step III) occurs after sub-step II): applying an image processing function to the entire light image or the setpoint image and/or to one or both lower-resolution images. This means that a sub-step III) occurs after sub-step II), which involves applying an image processing function to the entire light image in order to change the overall impression of that light image. The aim of such an image processing function can be, for example, to make the intensity transitions contained in the light image appear smoother, which can be achieved by applying a Gaussian blur to the light image, for example.

In particular, it can be provided that in order to achieve a setpoint energy efficiency derived from the setpoint operating signal according to step a), the time period between the zero passes is manipulated in such a way that in any case where an actual energy efficiency of the deflection unit falls below the setpoint energy efficiency, the time period between the zero position passes is increased. The higher the frequency with which the deflection unit is controlled, the higher the energy consumption and the lower the energy efficiency. Reducing the frequency makes it possible to operate the lighting device more economically, which again helps save energy and increase the service life of the actuator and the deflection device provided for it.

It can further be provided that the setpoint energy efficiency is predetermined in such a way that it is determined as a function of a detected driving speed of a vehicle comprising the motor vehicle light module together with the deflection unit such that the required setpoint energy efficiency increases as the driving speed decreases. For example, this can be done as a function of the measurement of an automotive speed sensor. For example, the frequency can be set lower for a welcome projection in stationary mode than in travelling mode, as selecting low frequencies can lead to unwanted stroboscopic effects in travelling mode.

In particular, it can be provided that in order to achieve a setpoint temperature derived from the setpoint operating signal according to step a), the time period between the zero passes is manipulated in such a way that in any case where an actual temperature of the deflection unit or of the motor vehicle light module exceeds a setpoint temperature, the time period between the zero position passes is increased.

It should be mentioned at this point that the individual functions or optimization tasks mentioned can also be weighted or hierarchically structured. If, for example, the function of the deflection unit is jeopardized by excessive temperatures being reached, the temperature requirements could be weighted higher than requirements stipulated as a function of the driving speed. The highest weighting can be given to all safety-related requirements. When, for example, the setpoint temperature is to be reduced (e.g. by lowering the deflection frequency or decreasing the amplitude) and at the same time dust/dirt over a permissible threshold is detected (which could be combated by increasing the deflection frequency). In this case, the requirement for the setpoint temperature is weighted higher as an excessive temperature can lead to an irreparable defect in the deflection unit.

It can further be provided that in order to achieve a setpoint image sharpness derived from the setpoint operating signal according to step a), the amplitude of the deflection is manipulated in such a way that a maximum amplitude is predetermined when maximum image sharpness is predetermined, and the amplitude is reduced as the setpoint image sharpness decreases. This does not necessarily mean an increase in frequency, but can also be achieved by virtue of the fact that the edges connecting two end positions together are steeper and the end positions can therefore be held longer in time while the duration of the overall work cycle remains the same. The faster the actuator movement or change in position of the deflecting element of the deflection unit is carried out, the sharper the image becomes; the slower the movement, the more the transitions between the first frame and the second frame are "mixed" together.

For example, in the case of dipped beam distribution, it can be advantageous that the light distribution exhibits blurring, i.e. blending between the visually perceptible light of adjacent pixels. If this is necessary, the deflection angle can be reduced. Blurring can also be advantageous for transitions from standard light distribution to another distribution.

In particular, it can be provided that in order to achieve a setpoint image resolution derived from the setpoint operating signal according to step a), the amplitude of the deflection is manipulated in such a way that a maximum amplitude is predetermined when maximum setpoint image resolution is predetermined, and the amplitude is reduced as the setpoint image resolution decreases.

It can further be provided that in the sub-step II), an optimum deflection of the two low-resolution images of the image pair is also calculated in relation to one another as a function of the setpoint operating signal.

In particular, it can be provided that the motor vehicle light module is designed to emit light images that are different from one another with a frequency of at least 60 Hz, typically between 60 Hz and 160 Hz such that different setpoint images with a frequency of at least 30 Hz are received and converted into individual low-resolution images of the respective image pair with a frequency of at least 60 Hz and emitted one after the other by the motor vehicle light module. The deflection unit can therefore be controlled with a frequency of at least 60 Hz or the deflection unit is designed to assume a desired deflection position within a maximum of $1/60$ of a second starting from any starting position.

It can further be provided that the deflection unit comprises a glass plate, which is pivotable or displaceable about at least one, preferably exactly one axis or exactly two axes.

In particular, it can be provided that the glass plate has a flat light entry surface and a light-emitting surface plane-parallel thereto, wherein the deflection unit has at least one electrical coil for each axis about which the glass plate can be pivoted, wherein a means for magnetic coupling to the respective coil is arranged on the glass plate for each coil such that a force can be exerted on the associated means by energizing the respective coil in such a way that the glass plate is pivoted about the respective axis as a function of the energizing of the coil, wherein for each axis about which the glass plate can be pivoted, the deflection unit also preferably has a mechanical restoring element, in particular a spring element, for restoring the glass plate to a neutral position, which the glass plate automatically assumes in the event of a failure of a power supply to the deflection unit or of a control variable provided for controlling the deflection unit. The glass plate is arranged in the beam path of the motor vehicle light module. The beam is deflected by refraction as it enters and exits the glass plate. Of course, two or more restoring elements can also be provided per axis.

The invention further relates to a motor vehicle light module, wherein the motor vehicle light module is designed to emit segmented light distribution, wherein the motor vehicle light module comprises a deflection unit, with which a native resolution of the motor vehicle light module can be visually increased by at least temporary beam deflection by means of the deflection unit, wherein the motor vehicle light module is designed to implement the method according to the invention.

All device features named in the method can also form part of the motor vehicle light module, unless stated otherwise. Conversely, all device features named in conjunction with the motor vehicle light module can also form part of the aforementioned method. The motor vehicle light module can relate both to a signalling light and a motor vehicle headlight. The motor vehicle light module is preferably designed for use in a motor vehicle light, in particular in a signalling light or in a motor vehicle headlight. Accordingly, the motor vehicle light module can also be part of the aforementioned devices.

BRIEF DESCRIPTION OF THE DRAWINGS

The invention is outlined in more detail below based on exemplary and non-limiting embodiments, which are illustrated in the figures. In the figures

DETAILED DESCRIPTION OF EMBODIMENTS OF THE INVENTION

In the following figures, unless otherwise stated, the same reference numbers denote the same features.

Figure 1A:
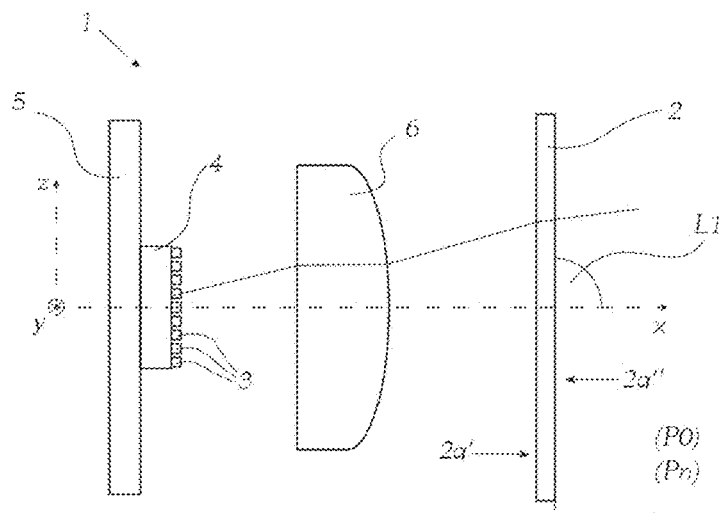
FIG. 1a shows a side view of a schematic illustration of a motor vehicle light module for use in conjunction with the present invention.

FIG. 1a shows a side view of a schematic illustration of a motor vehicle light module 1 for use in conjunction with the present invention. The motor vehicle light module 1 is designed to emit segmented light distribution. For this purpose, it comprises a light source 4, which comprises, for example, a matrix of individually controllable LEDs, wherein each LED is associated with a segment of light distribution that can be emitted and forms a light pixel 3 of the light distribution.

Other light sources of light sources systems suitable for producing segmented light distribution can of course also be used. The light source is typically arranged on a circuit carrier 5, in particular on a PCB. The light emitted by the light source 4 can, for example, pass through an optical component 6, for example an expansion optical system, before it then enters a deflection unit 2. A native resolution An is typically defined by the number of individually controllable light areas of the light source 4. If the light source 4 has, for example, 100 individually controllable LEDs arranged in a matrix of 10 columns and 10 rows, this results in 100 segments or a native resolution An of 10×10. The deflection unit 2 is designed to deflect light rays LI emitted by the light source 4. For this purpose, it can be provided that the deflection unit 2 comprises a glass plate 2a, which is pivotable or displaceable about at least one axis. More detailed information on this will be discussed below in connection with FIGS. 2a to 2c.

Figure 1B:
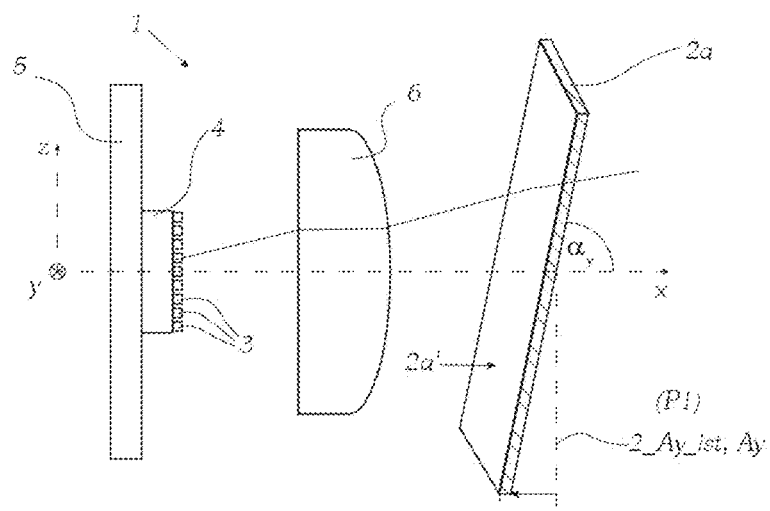
FIG. 1b shows the side view according to FIG. 1a with a tilted deflection unit.
Figure 1C:
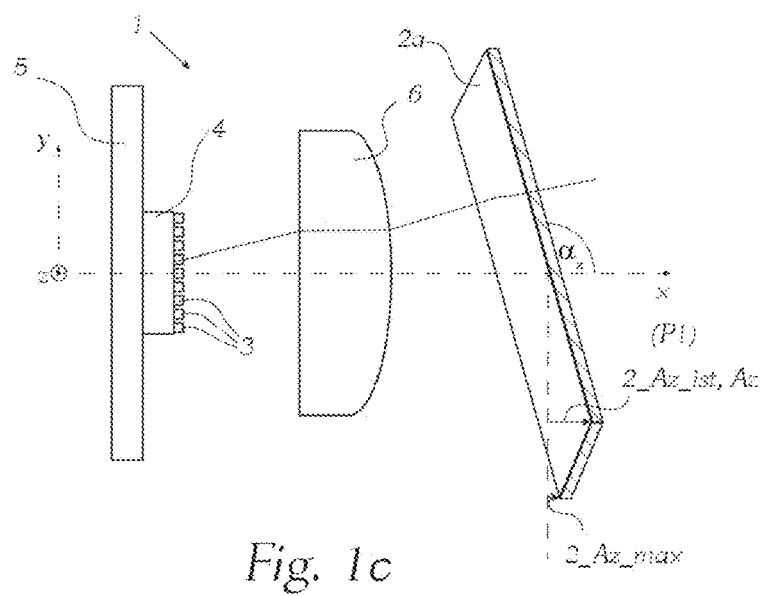
FIG. 1c shows a plan view of the motor vehicle light module in the position according to FIG. 1b.

FIG. 1a to 1c show that the beam is deflected by the deflection unit 2, e.g. by refraction of the light as it enters and leaves the deflection unit 2. More specifically, the light is refracted at a light entry surface 2a' and at a light-emitting surface 2a" of the glass plate 2a. As a result, the outgoing light is offset from the light path of the incoming light. The light ray LI is thus deflected. This deflection is used in the present invention to visually increase a native resolution An of the motor vehicle light module 1 by at least temporary beam deflection by means of the deflection unit 2. This is achieved by time-variable deflection by means of the deflection unit 2, typically at a speed that is high enough for the human eye to perceive light distributions emitted one after the other, which differ at least through different positions of the deflection unit 2 in terms of the position of the individual segments, as a common light distribution with correspondingly higher resolution. The frequency is preferably at least 60 Hz.

For a better overview, a Cartesian coordinate system was used in some figures, which was chosen such that the x-axis coincides with a main emission direction (in the case of a vehicle headlight, typically the forwards direction of travel of a vehicle), the y-axis is orthogonal thereto and horizontally oriented, and the z-axis is vertically oriented and thus oriented at right angles to the plane spanned by the x- and y-axes. In the exemplary embodiment shown here according to FIG. 1a to FIG. 1c, the glass plate 2a can be pivoted about two axes, namely about the y-axis (see FIG. 1b) and about the z-axis (see FIG. 1c).

FIG. 1a shows the glass plate 1a in a non-deflected reference state P0, which coincides with a neutral position Pn in the present example. However, these two positions can also differ from one another. The deflection unit 2 can thus have a neutral position Pn, which the deflection unit 2 automatically assumes in the event of a failure of a power supply to the deflection unit 2 or of a control variable 2_s provided for controlling the deflection unit 2. An amplitude 2_A_ist of the deflection is equal to zero in the position according to FIG. 1a.

As already mentioned, it can be provided that the light distribution is segmented by individually controllable light pixels 3. These are preferably arranged next to each other in a matrix with a resolution of at least two rows and two columns, substantially without gaps. A maximum amplitude 2_Ay_max (see FIG. 1b) and/or 2_Az_max (see FIG. 1c) of the deflection is selected such that compared to a non-deflected reference state P0, the deflected state P1 has a vertical and a horizontal offset of half a pixel width such that when the maximum amplitude of the deflection is reached—with the exception of edge pixels—each deflected light pixel 3 (as seen after passing through the deflection unit 2) spatially overlaps four non-deflected light pixels by 25% each.

Figure 4:
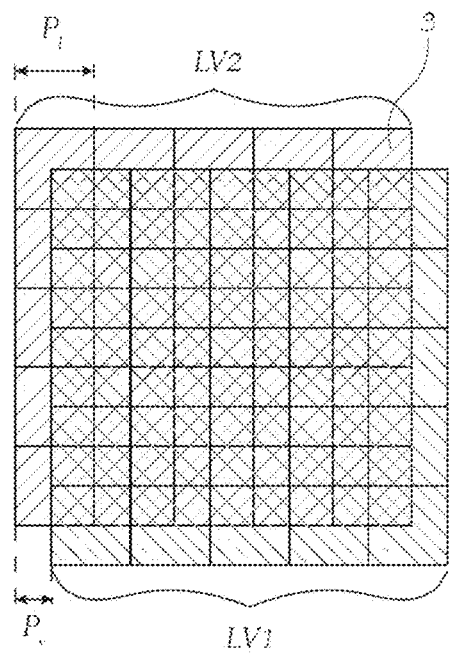
FIG. 4 shows an illustration of two light distributions, which can be emitted one after the other by means of a motor vehicle light module according to the invention.

FIG. 1b shows the side view according to FIG. 1a with a tilted deflection unit 2. The deflection unit 2 or glass plate 2a has been pivoted about the y-axis by the angle $\square_y$, which results in the amplitude of the deflection 2_Ay_ist. The value of 2_Ay_ist is slightly smaller than the maximum deflection in this direction, namely 2_Ay_max, such that the maximum increase in the perceptible resolution does not occur yet, as can be seen in FIG. 4. The displacement $P_v$ of a light pixel 3 of a downstream image (or corresponding light distribution) or a downstream segmented light emission is less than half the side length $P_1$ of a light pixel 3. Only when the displacement $P_v$ (both upwards and sideways) of the light pixels 3 is half the side length $P_1$ of a light pixel 3 is the maximum increase in perceptible resolution achieved.

FIG. 1c shows a plan view of the motor vehicle light module 1 in the position according to FIG. 1b. The glass plate 2a has been pivoted about the z-axis by the angle $\square_z$, which results in the amplitude of the deflection 2_Az_ist. The value of 2_Az_ist is slightly smaller than the maximum deflection in this direction, namely 2_Az_max, such that here too the maximum increase in the perceptible resolution does not occur yet.

Figure 2A:
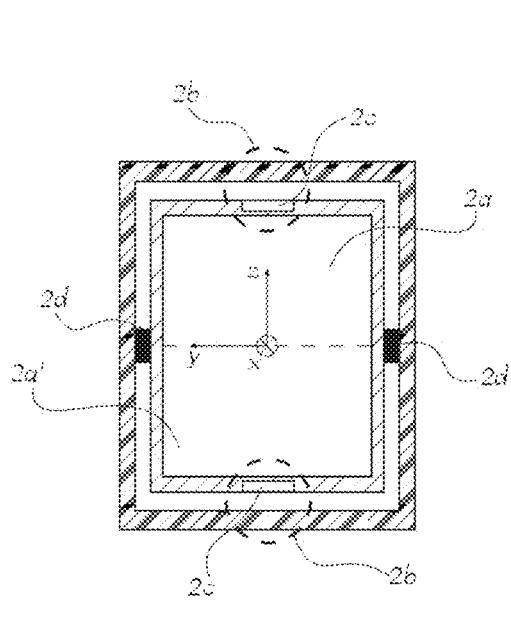
FIG. 2a shows a schematic illustration of a first embodiment of a deflection unit.

FIG. 2a shows a schematic illustration of a first embodiment of a deflection unit 2. The deflection unit 2 comprises the aforementioned glass plate 2a as well as two mechanical restoring elements 2d, in particular spring elements 2b in the form of torsion springs, which are arranged along the y-axis and thus enable the glass plate 2a to swing around the y-axis. Two electrical coils 2a, which form part of the deflection unit 2, are arranged normal to the y-axis and along the z-axis. The coils 2b can be energized and are designed to exert a magnetic force on a corresponding means 2c for magnetic coupling, for example a magnet, arranged on the glass plate.

In other words, it can be said that the glass plate 2a has a flat light entry surface 2a' and a light-emitting surface 2a" plane-parallel thereto (see FIG. 1a), wherein the deflection unit 2 has at least one electrical coil 2b for each axis about which the glass plate 2a can be pivoted, wherein a means 2c for magnetic coupling to the respective coil 2b is arranged on the glass plate 2a for each coil 2b such that a force can be exerted on the associated means 2c by energizing the respective coil 2b in such a way that the glass plate 2a is pivoted, in particular rotated, about the respective axis as a function of the energizing of the coil 2b. For each axis about which the glass plate 2a can be pivoted, a mechanical restoring element 2d is provided, in particular a spring element, for restoring the glass plate 2a to a neutral position Pn, which the glass plate 2a automatically assumes in the event of a failure of a power supply to the deflection unit 2 or of a control variable 2_s provided for controlling the deflection unit 2 (see FIG. 5). In addition or alternatively to this type of electromechanical force transmission, suitably coupled piezo actuators can also be used.

Figure 2B:
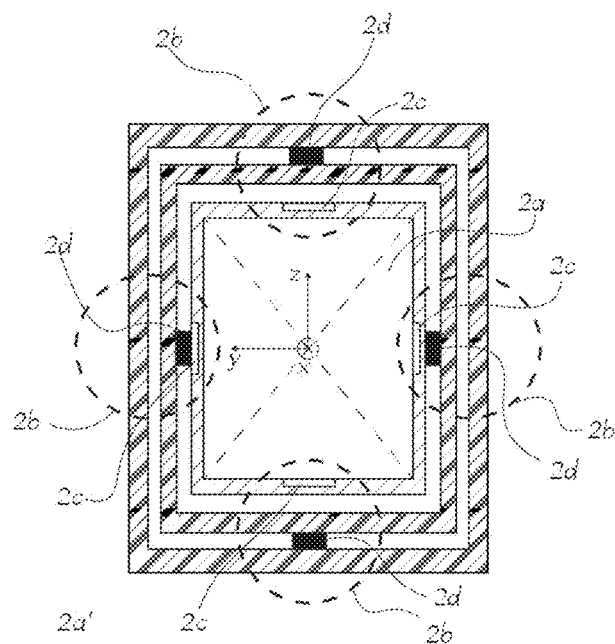
FIG. 2b shows a schematic illustration of a second embodiment of a deflection unit.

FIG. 2b shows a schematic illustration of a second embodiment of a deflection unit 2. In contrast to FIG. 2, the glass plate 2a here can be pivoted about two axes, namely the y- and z-axes. Restoring elements 2d are also arranged here along the pivot axes. Coils 2b and coupling means 2 are respectively arranged in-between. This embodiment involves pivoting with two degrees of freedom, i.e. the deflection about the y-axis is independent of the deflection about the z-axis and vice versa. As a result, diagonal deflections can also be achieved through deflection about both axes.

Figure 2C:
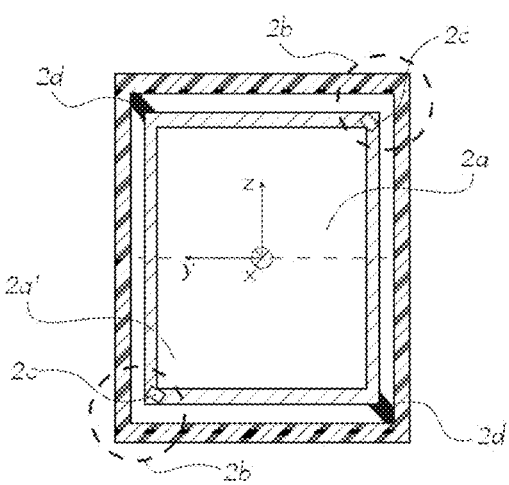
FIG. 2c shows a schematic illustration of a third embodiment of a deflection unit.

FIG. 2c shows a schematic illustration of a third embodiment of a deflection unit 2. Here, the glass plate 2a is suspended in such a way that a deflection is already diagonal to the y- and z-axes. This means that the deflection axis is transverse to these two y- and z-axes. Despite the fact that the number of degrees of freedom of the deflection is only one in this case, this choice of deflection axis enables a deflection that increases the visually perceptible resolution by a factor of four compared to the native resolution.

Figure 3:
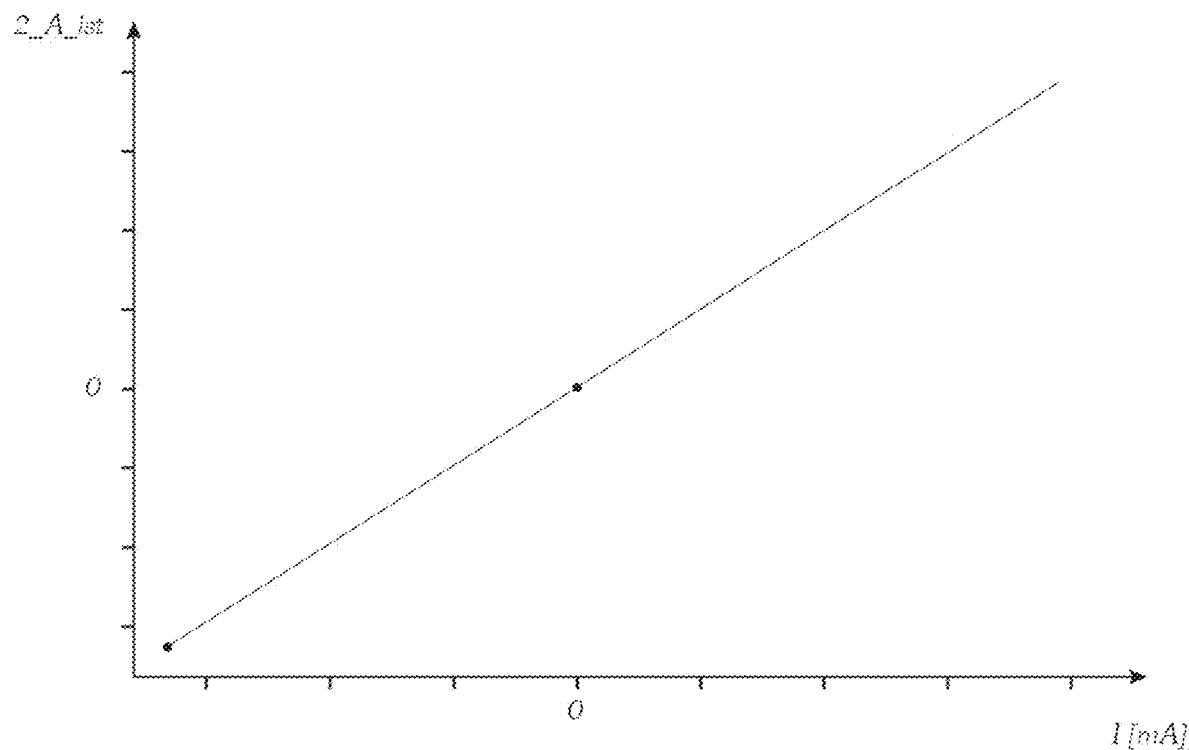
FIG. 3 shows a graph displaying the static relationship between coil current and deflection of a typical deflection unit, as it can be used for the invention.

FIG. 3 shows a graph displaying the static relationship between coil current and deflection of a typical deflection unit 2, as it can be used for the invention. This shows a linear relationship between current and deflection for the static case. The deflection 2_A_ist is proportional to the current I fed into the coils 2b. In dynamic operation, the mass inertia of the glass plate 2a, any inertia of the restoring elements 2d, inductive effects of the coils 2d etc. are, of course, taken into account. A person skilled in the art is able to utilize corresponding control algorithms to control the coils 2b in order to achieve the desired positions of the glass plate 2a of the deflection element 2 at any time.

FIG. 4 shows an illustration of two light distributions LV1 and LV2, which can be emitted one after the other by means of a motor vehicle light module 1 according to the invention. The light distributions respectively comprise 5×5 pixels, which, arranged above and next to one another, together form a square. The square associated with the second light distribution LV2 is offset by approximately less than half a pixel length P1 with respect to the square associated with the first light distribution LV1 both in a horizontal and vertical direction. It can be seen that the light pixels overlap one another and in the region where the squares overlap, the impression is created that the number of light pixels has now been increased fourfold as every light pixel is split into four different overlapping regions. The immediately consecutive emission of the light distribution LV1 and LV2 therefore creates a visual impression of a resolution that is significantly increased compared to the native resolution (in this case 5×5) of the motor vehicle light module. The impression of increased resolution is at its maximum when the offset of the light pixels is ½ a pixel length P1.

Figure 5:
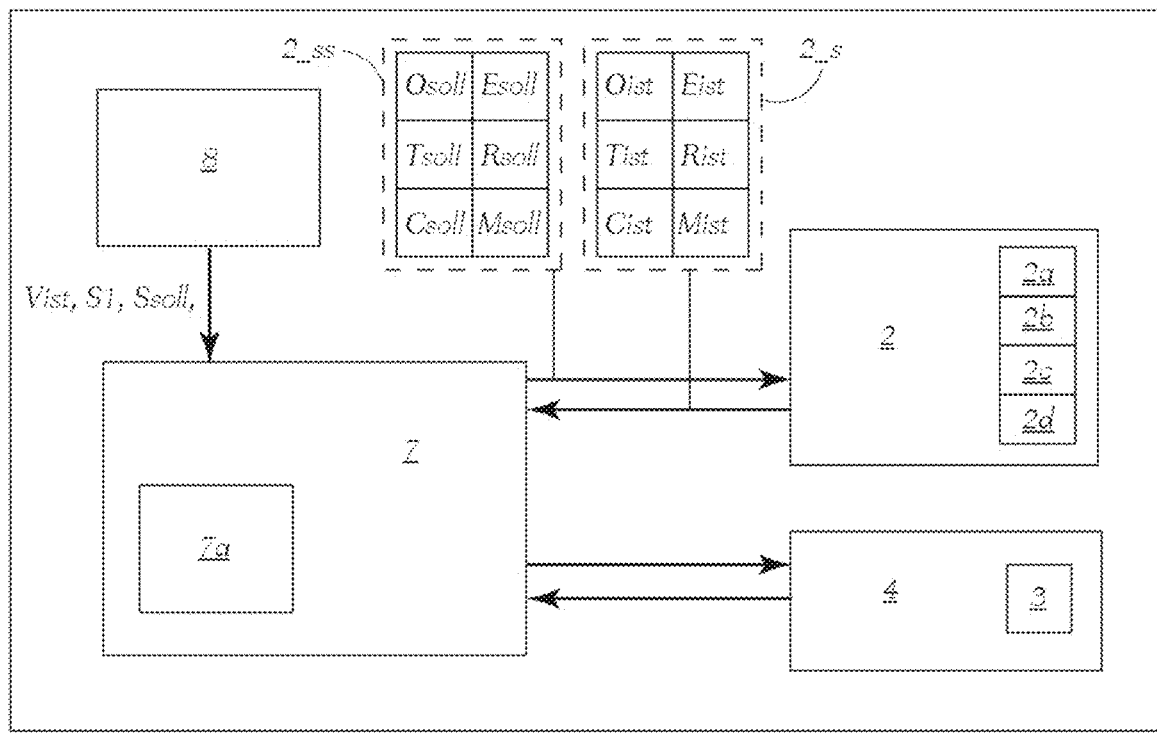
FIG. 5 shows a block diagram relating to individual possible components of the invention.

FIG. 5 shows a block diagram relating to individual possible components of the invention. It shows that the light pixels 3 are associated with the light source 4, which is controlled by a control unit 7. The control unit 7 comprises a calculation unit 7a, which, for example as a function of an incoming image signal S1, controls the light source 4 in such a way that those segments or light pixels 3 are controlled according to an image predetermined by the image signal S1, also referred to as setpoint image Ssoll, such that the image predetermined by the image signal S1 is reproduced as faithfully as possible. In particular in those cases where the predetermined image has a resolution that exceeds the native resolution An of the motor vehicle light module 1, a visual impression that is as similar as possible to the predetermined setpoint image Ssoll can be created by superimposing the different light distributions by means of targeted calculation of different light distributions LV1 and LV2 as well as adaptation/calculation of the deflection positions associated with the respective light distributions, e.g. Pn, P0, P1. The image signal S1 can be fed to the control unit 7 via a data source 8.

There are certain degrees of freedom when controlling the deflection unit 2. In principle, an increased frequency of the deflection of the glass plate 2a and a greater amplitude of the deflection is associated with increased energy consumption and wear of the electromechanical components involved. Depending on how precisely the setpoint image Ssoll is to be reproduced and also whether any further functions such as blurring are to be applied to the setpoint image Ssoll, it is possible to specifically intervene in the calculation of the deflection by means of the deflection unit 2, as will be explained in more detail in relation to FIGS. 6a to 6c. For this purpose, the control unit 7 is supplied with a setpoint operating signal 2_ss, which provides information about how precisely the setpoint image Ssoll is to be reproduced, whether other boundary conditions such as specifications for setpoint energy efficiency Esoll, setpoint temperature Tsoll, setpoint image resolution Rsoll, setpoint image sharpness Csoll, setpoint clarity Msoll, and/or offset correction Osoll are to be taken into account, and if they are, with what hierarchical weighting individual specification are to be taken into account.

Figure 6A:
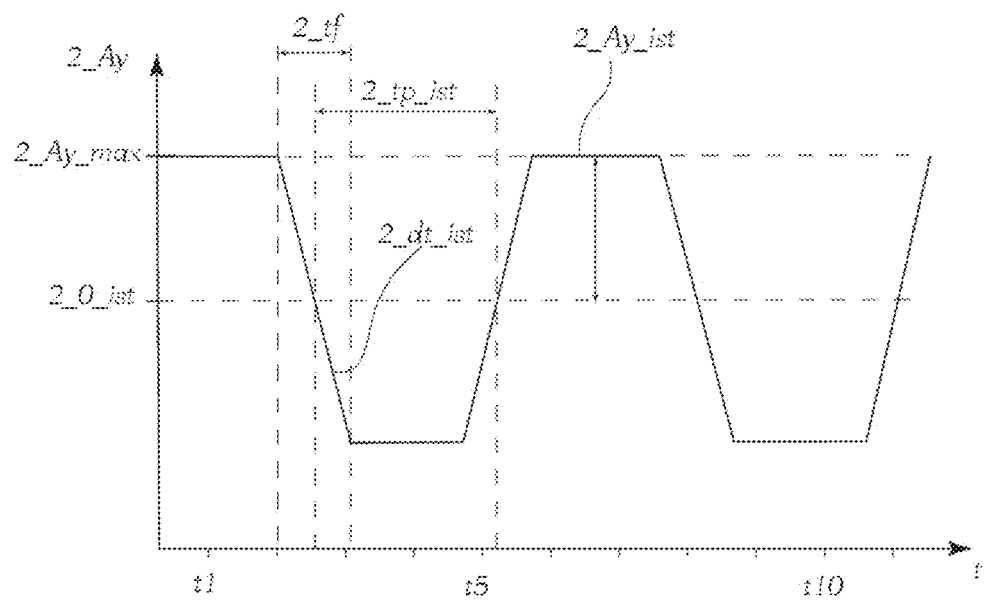
FIG. 6a shows an illustration of a first time course of deflections of a deflection unit, which can be used in the present invention.

FIG. 6a shows an illustration of a first time course of deflections of a deflection unit 2. More specifically, it shows (as do FIGS. 6b and 6c) the time course of the deflection 2_Ay_ist whilst the glass plate 2a rotates about the y-axis. All of the above for the deflection about the y-axis can of course be applied in a similar way in the case of a sole or additional deflection about the z-axis.

Figure 6B:
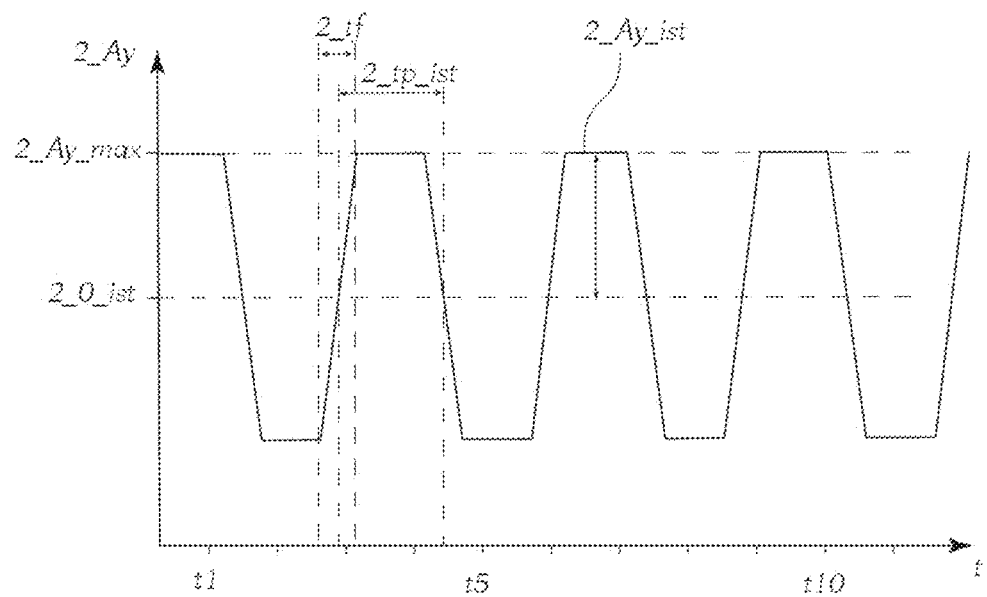
FIG. 6b shows an illustration of a second time course of deflections of a deflection unit, which can be used in the present invention.
Figure 6C:
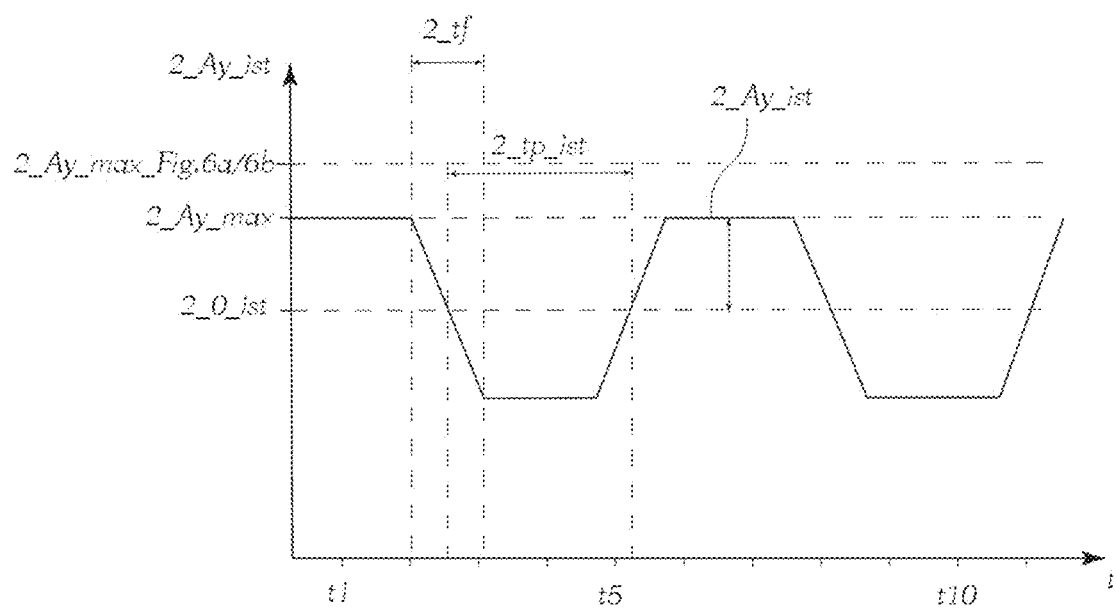
FIG. 6c shows an illustration of a second time course of deflections of a deflection unit, which can be used in the present invention.

The rotation can, for example, be a few tenths of a degree to a few degrees. The deflection or the amplitude of the deflection can, for example, assume a maximum value 2_Ay_max, as shown in FIGS. 6a and 6b. In contrast, in FIG. 6c, this maximum value 2_Ay_max of the deflection is reduced, as can be seen by comparing it to the value 2_Ay_max_FIG. 6a/6b also shown in FIG. 6c.

FIG. 6b shows a variant in which a time period 2_tp_ist between the zero position passes has been reduced compared to FIG. 6a. Specifically, both the frequency of the deflection and the edge steepness between the deflection positions 2_Ay_max or −2Ay_max to be reached have been increased. An edge time period 2_tf has therefore also been reduced in FIG. 6b compared to FIG. 6a. The emission of light by the light sources 4 can thus be timed such that this only occurs in the time period between the edges, i.e. outside of 2_tf. In this way, for example, the sharpness of the image can be further increased, as blurring of the emission is avoided.

Figure 7A:
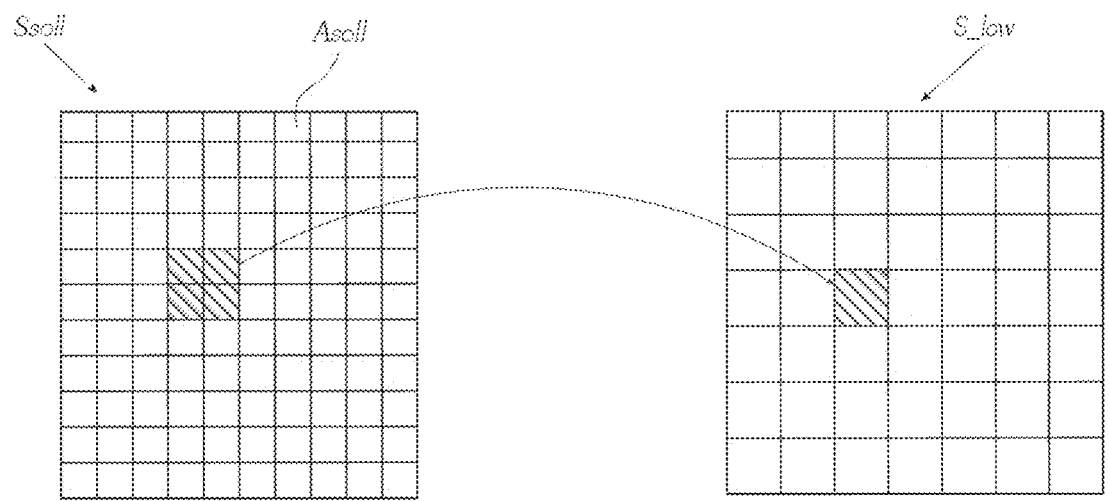
FIG. 7a shows a section of an illustration of a setpoint image and a calculated image with lower resolution.

FIG. 7a shows a section of an illustration of a setpoint image Ssoll and a calculated image with lower resolution S_low. Unlike in the present invention, the setpoint image Ssoll in the example according to FIG. 7a is only resolved into a low-resolution image S_low.

Figure 7B:
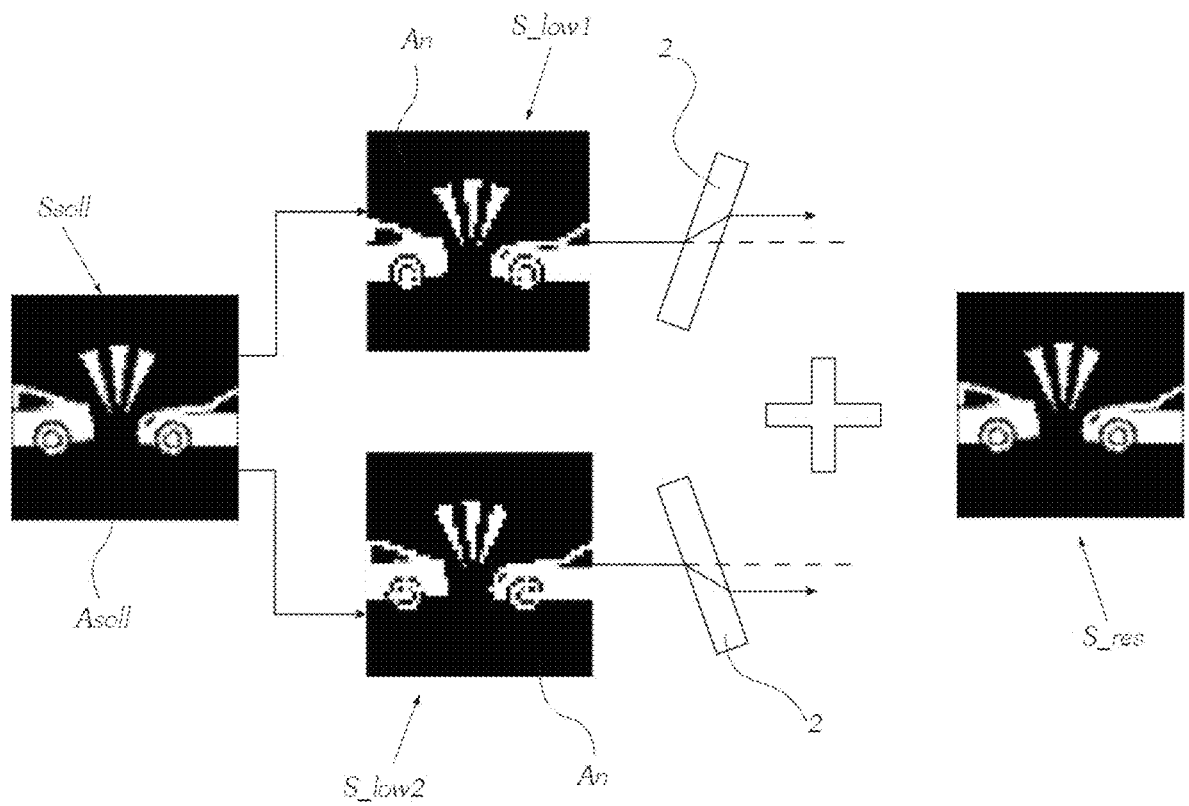
FIG. 7b shows a section of an illustration of a setpoint image Ssoll and a calculated image with lower resolution S_low.

FIG. 7b shows an exemplary setpoint image Ssoll, two calculated lower-resolution images S_low1, S_low2 as well as the superimposition of the two low-resolution images S_low1, S_low2 to create a consecutively emitted image pair S_res. The invention relates to a method shown in FIG. 7b for resolution-optimized control of a motor vehicle light module 1. The motor vehicle light module 1 is designed to emit segmented light distribution. The motor vehicle light module 1 comprises a deflection unit 2, with which a native resolution An of the motor vehicle light module 1 can be visually increased by at least temporary beam deflection by means of the deflection unit 2. The method comprises the following steps: a) receiving an image signal S1, wherein the image signal S1 contains a setpoint image Ssoll of light distribution, wherein the setpoint image Ssoll has a resolution Asoll, which exceeds the native resolution An of the motor vehicle light module 1, b) converting the setpoint image Ssoll received according to step a) into two lower-resolution images S_low1, S_low2, which together form an image pair S_res, wherein the lower-resolution images S_low1, S_low2 are selected in such a way that they respectively have the native resolution An of the motor vehicle light module 1, wherein the lower-resolution images S_low1, S_low2 are also matched to each other in such a way that at least one of the two lower-resolution images S_low1, S_low2 is deflected by means of the deflection unit 2 such that the superimposition of the two lower-resolution images S_low1, S_low2 produces an image impression more similar to the setpoint image Ssoll than the reproduction of the two low-resolution images S_low1, S_low2 on their own, c) controlling the motor vehicle light module, wherein it is controlled in such a way that the two low-resolution images S_low1, S_low2 of the image pair S_res are emitted one after the other by the motor vehicle light module 1.

It can be seen in FIG. 7b that not only the appearance of the low-resolution images S_low1, S_low2 has an influence on the appearance of the image pair S_res displayed by superimposing these images, but also the extent of the deflection of the two low-resolution images S_low1, S_low2 relative to one another has an influence on the appearance of the image pair S_res. Advantageously, the degrees of freedom obtained by vertically and/or horizontally displacing the low-resolution images S_low1, S_low2 in relation to each other can therefore be taken into account when calculating the low-resolution images S_low1, S_low2. This means that the low-resolution images S_low1, S_low 2 can be calculated such that they together produce an ideal image impression at a certain displacement relative to one another.

Figure 7C:
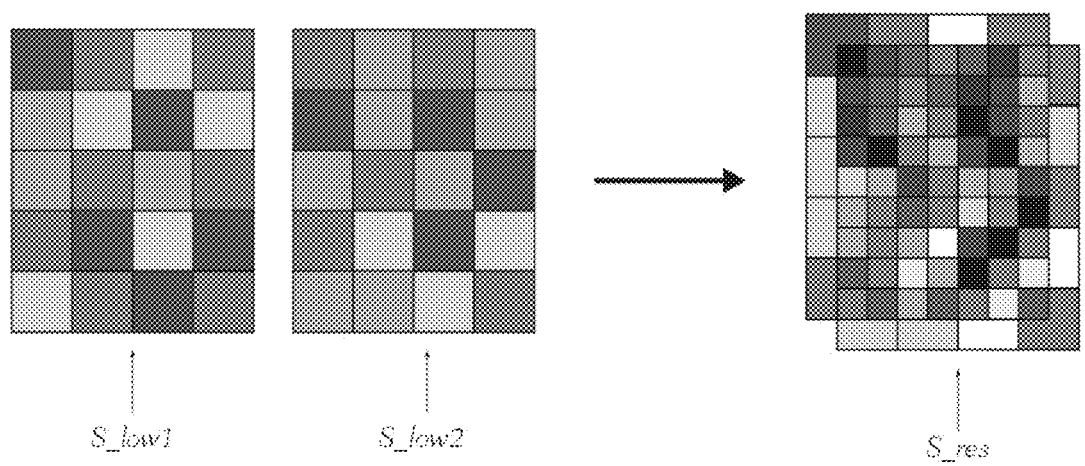
FIG. 7c shows a further example of a superimposition of two low-resolution images.

FIG. 7c shows a further example of a superimposition of two low-resolution images S_low1 and S_low 2, wherein the low-resolution images have light pixels 3, which are arranged in a matrix with a resolution of 4×5.

Figure 7D:
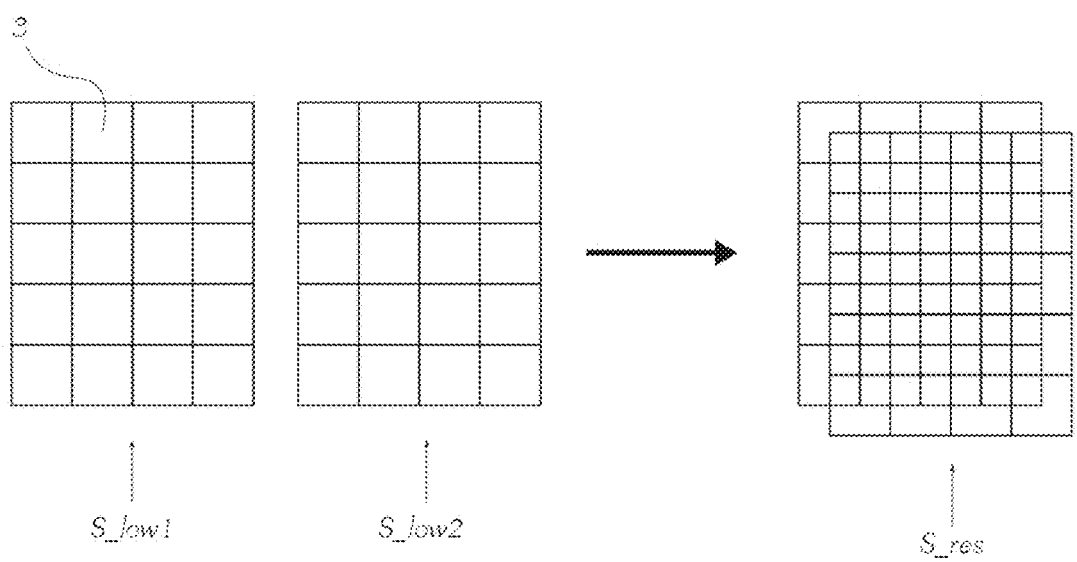
FIG. 7d shows a further example of a superimposition of two low-resolution images comprising grey areas.

FIG. 7d shows a further example of a superimposition of two low-resolution images S_low1, S_low2 comprising grey areas. The image pair S_res appears to have a significantly higher native resolution than the low-resolution images S_low1, S_low2.

Figure 7E:
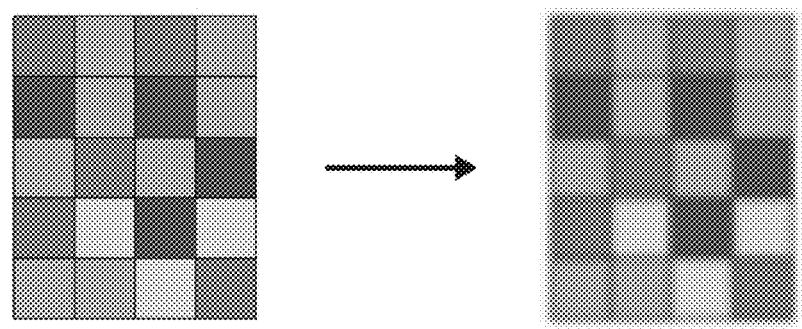
FIG. 7e shows an example of an application of a Gaussian blur filter.

FIG. 7e shows an exemplary application of a Gaussian blur filter. The left-hand unfiltered image is in focus and the right-hand image, which has been processed using the Gaussian blur filter function, is noticeably blurred.

Returning to the aforementioned FIGS. 1a to 6c, it should be mentioned that before or during step b) of the method according to the invention, the following additional sub-steps can be carried out: I) receiving a setpoint operating signal $2\_ss$, wherein the setpoint operating signal $2\_ss$ contains information on at least one of the following criteria: setpoint image sharpness; setpoint energy efficiency; setpoint temperature; setpoint clarity; offset correction; II) calculating control parameters that can be derived therefrom to influence a control variable $2\_s$ provided for controlling the deflection unit 2. In particular, it can be provided that a sub-step III occurs after sub-step II, which involves applying an image processing function to the entire light image.

It can further be provided that in to achieve a setpoint energy efficiency Esoll derived from the setpoint operating signal $2\_ss$ according to step a), the time period $2\_tp\_ist$ between the zero passes is manipulated in such a way that in any case where an actual energy efficiency Eist of the deflection unit 2 falls below the setpoint energy efficiency Esoll, the time period between the zero position passes $2\_tp\_ist$ is increased.

In particular, it can be provided that the setpoint energy efficiency Esoll is predetermined in such a way that it is determined as a function of a detected driving speed Vist of a vehicle comprising the motor vehicle light module 1 together with the deflection unit 2 such that the required setpoint energy efficiency increases as the driving speed decreases. In order to achieve a setpoint temperature Tsoll derived from the setpoint operating signal $2\_ss$ according to step a), it can be provided that the time period $2\_tp\_ist$ between the zero passes is manipulated in such a way that in any case where an actual temperature Tist of the deflection unit 2 or of the motor vehicle light module 1 exceeds a setpoint temperature Tsoll, the time period $2\_tp\_ist$ between the zero position passes is increased.

In order to achieve a setpoint image sharpness derived from the setpoint operating signal $2\_ss$ according to step a), it can be provided that the amplitude $2\_A\_ist$ of the deflection is manipulated in such a way that a maximum amplitude $2\_Ay\_max$, $2\_Az\_max$ is predetermined when maximum image sharpness is predetermined, and the amplitude $2\_A\_ist$ is reduced as the setpoint image sharpness decreases.

In order to achieve a setpoint image resolution Rsoll derived from the setpoint operating signal $2\_ss$ according to step a), it can be provided that the amplitude $2\_A\_ist$ of the deflection is manipulated in such a way that a maximum amplitude $2\_Ay\_max$, $2\_Az\_max$ is predetermined when maximum setpoint image resolution is predetermined, and the amplitude $2\_A\_ist$ is reduced as the setpoint image resolution decreases.

It can further be provided that in order to achieve a setpoint energy efficiency Esoll derived from the setpoint operating signal $2\_ss$ according to step a, the amplitude $2\_A\_ist$ of the deflection is manipulated in such a way that in any case where an actual energy efficiency Eist of the deflection unit 2 falls below the setpoint energy efficiency, the amplitude $2\_A\_ist$ of the deflection is reduced.

In particular, it can be provided that in order to achieve an offset correction derived from the setpoint operating signal $2\_ss$ according to step a, the zero position $2\_0\_ist$ of the deflection is manipulated.

It can further be provided that in order to achieve a setpoint image sharpness Csoll derived from the setpoint operating signal $2\_ss$ according to step a, the temporal rate of change $2\_dt\_ist$ (see FIG. 6a) of the deflection is manipulated in such a way that in any case where an actual image sharpness Cist of the deflection unit 2 falls below the setpoint image sharpness Csoll, the temporal rate of change $2\_dt\_ist$ of the deflection is increased. This increase in the temporal rate of change can only affect the time period of the edges $2\_tf$, for example. The end positions $2\_Ay\_max$ can thus be held for longer at a constant frequency due to a steeper edge. The implementation of steeper edges is usually associated with greater electromechanical requirements or stresses on the deflection unit 2. In other words, this aspect does not therefore necessarily mean an increase in frequency; rather, steeper edges can simply be provided between two end positions. The faster the actuator is moved to the desired positions, the sharper the image becomes; the slower the desired position is reached, the more the transitions between the first frame and the second frame are "mixed" together.

It can further be provided that in the sub-step II, an optimum deflection of the two low-resolution images S_low1, S_low2 of the image pair S_res is also calculated in relation to one another as a function of the setpoint operating signal $2\_ss$.

In particular, it can be provided that the motor vehicle light module 1 is designed to emit light images that are different from one another with a frequency of at least 60 Hz, typically between 60 Hz and 160 Hz such that different setpoint images Ssoll with a frequency of at least 30 Hz are received and converted into individual low-resolution images S_low1, S_low2 of the respective image pair S_res with a frequency of at least 60 Hz and emitted one after the other by the motor vehicle light module 1.

Figure 8:
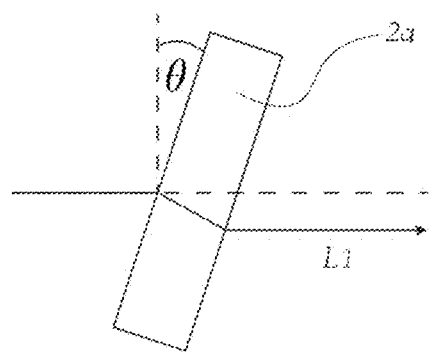
FIG. 8 shows an exemplary deflection of a light ray by means of a glass plate as well as an associated formula for calculating the extent of the deflection.

FIG. 8 shows an exemplary deflection of a light ray LI by means of a glass plate 2a as well as an associated formula for calculating the extent of the deflection.

Figure 9:
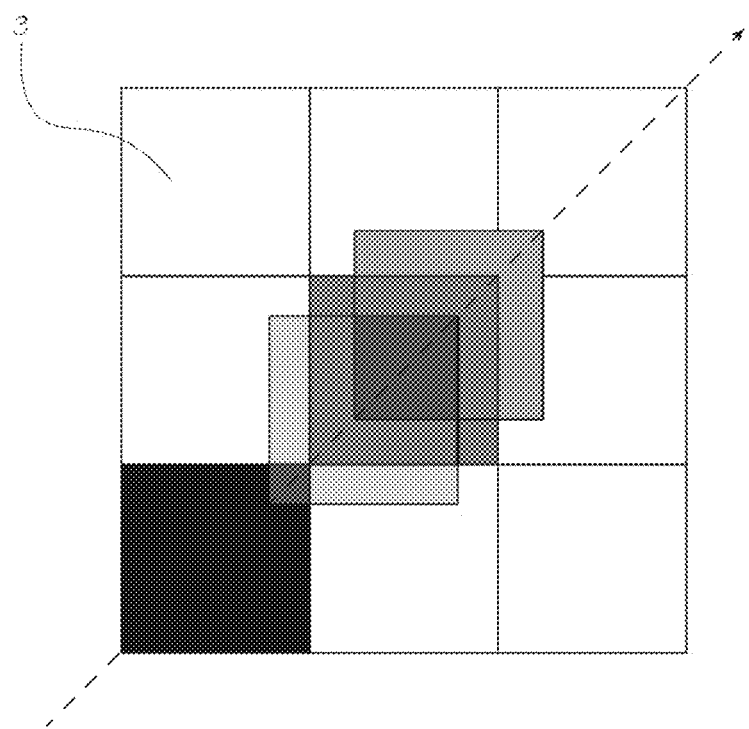
FIG. 9 shows an option for adjusting the brightness of individual light pixels.

FIG. 9 shows an option for adjusting the brightness of individual light pixels. It shows that the resulting light pixels of the superimposed light image become correspondingly darker or brighter when they overlap. A non-deflected light image is shown in the background. Two deflected light pixels can be seen in the centre over it. In the regions where light pixels overlap, the intensity is determined by the intensity values of the overlapping pixels. The intensity of the individual lighting elements of the light source is determined by controlling the light source. The more current is fed into the light source, the brighter the individual lighting element shines.

Figure 10:
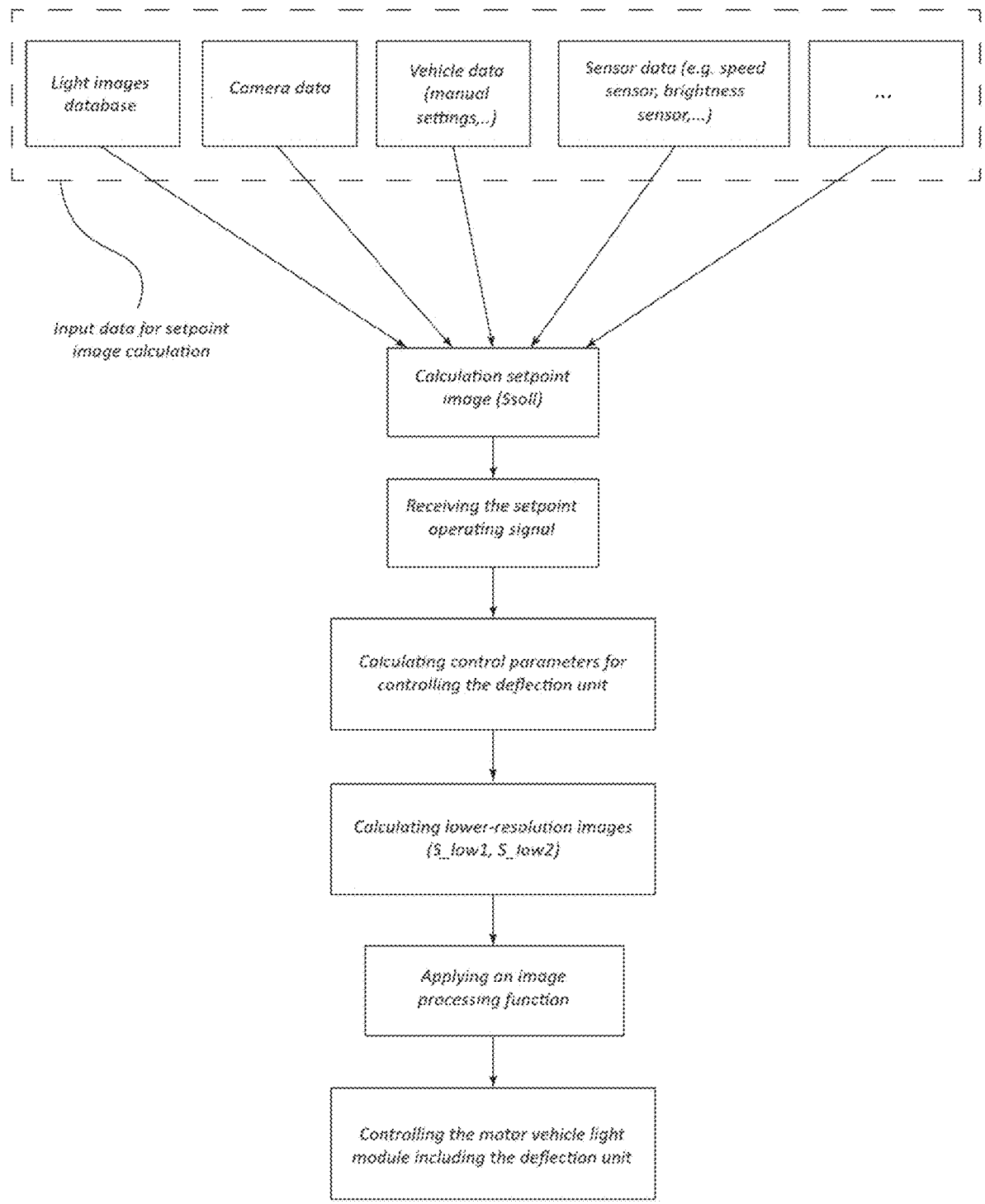
FIG. 10 shows an exemplary flow chart on the method according to the invention.

FIG. 10 shows an exemplary flow chart on the method according to the invention.

The invention further relates to a motor vehicle light module 1, wherein the motor vehicle light module 1 is designed to emit segmented light distribution, wherein the motor vehicle light module 1 comprises a deflection unit 2, with which a native resolution of the motor vehicle light module 1 can be visually increased by at least temporary beam deflection by means of the deflection unit 2, wherein the motor vehicle light module 1 is designed to implement the method according to the invention. Of course, the motor vehicle light module 1 can comprise components such as the aforementioned control unit 7, the light source 4, the optical element 6, any projection optics etc.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A method for resolution-optimized control of a motor vehicle light module (1), wherein the motor vehicle light module (1) is designed to emit segmented light distribution, wherein the motor vehicle light module (1) comprises a deflection unit (2), with which a native resolution (An) of the motor vehicle light module (1) can be visually increased by at least temporary beam deflection by means of the deflection unit (2), the method comprising:
   a) receiving an image signal (S1), wherein the image signal (S1) contains a setpoint image (Ssoll) of light distribution, wherein the setpoint image (Ssoll) has a resolution (Asoll), which exceeds the native resolution (An) of the motor vehicle light module (1);
   b) converting the setpoint image (Ssoll) received according to step a) into two lower-resolution images (S_low1, S_low2), which together form an image pair (S_res), wherein the lower-resolution images (S_low1, S_low2) are selected in such a way that they respectively have the native resolution (An) of the motor vehicle light module (1), wherein the lower-resolution images (S_low1, S_low2) are also matched to each other in such a way that at least one of the two lower-resolution images (S_low1, S_low2) is deflected by means of the deflection unit (2) such that the superimposition of the two lower-resolution images (S_low1, S_low2) produces an image impression more similar to the setpoint image (Ssoll) than the reproduction of the two low-resolution images on their own; and
   c) controlling the motor vehicle light module, wherein it is controlled in such a way that the two low-resolution images (S_low1, S_low2) of the image pair (S_res) are emitted one after the other by the motor vehicle light module (1).

2. The method according to claim 1, wherein the motor vehicle light module (1) has individually controllable light pixels (3), wherein the light distribution is segmented by the individually controllable light pixels (3), which are arranged next to each other in a matrix with a resolution of at least two rows and two columns, substantially without gaps, wherein it is preferably provided that a maximum deflection carried out by the deflection unit (2) is designed such that compared to a non-deflected reference state (P0), the deflected state (P1) has a vertical and a horizontal offset of half a pixel width such that when the maximum amplitude of the deflection is reached—with the exception of edge pixels—each deflected light pixel (3) spatially overlaps four non-deflected light pixels by 25% each.

3. The method according to claim 1, wherein the deflection unit (2) has a neutral position (Pn), which the deflection unit (2) automatically assumes in the event of a failure of a power supply to the deflection unit (2) or of a control variable (2_s) provided for controlling the deflection unit (2), wherein an algorithm is preferably provided for checking the correct calculation and output of the control variable (2_s), wherein if a malfunction is detected, the deflection unit (2) is moved to the neutral position (Pn).

4. The method according to claim 1, wherein before or during step b), the following additional sub-steps are carried out:
   I) receiving a setpoint operating signal (2_ss), wherein the setpoint operating signal (2_ss) contains information on at least one of the following criteria: setpoint energy efficiency (Esoll); setpoint temperature (Tsoll); setpoint image sharpness (Csoll); setpoint clarity (Msoll); offset correction (Osoll); and
   II) calculating control parameters that can be derived therefrom to influence a control variable (2_s) provided for controlling the deflection unit (2).

5. The method according to claim 4, wherein a sub-step III) occurs after sub-step II): applying an image processing function to the setpoint image (Ssoll) and/or to one or both lower-resolution images (S_low1, S_low2).

6. The method according to claim 4, wherein in order to achieve a setpoint energy efficiency (Esoll) derived from the setpoint operating signal (2_ss) according to step a), the time period (2_tp_ist) between the zero passes is manipulated in such a way that in any case where an actual energy efficiency (Eist) of the deflection unit (2) falls below the setpoint energy efficiency (Esoll), the time period between the zero position passes (2_tp_ist) is increased.

7. The method according to claim 4, wherein the setpoint energy efficiency (Esoll) is predetermined in such a way that it is determined as a function of a detected driving speed (Vist) of a vehicle comprising the motor vehicle light module (1) together with the deflection unit (2) such that the required setpoint energy efficiency increases as the driving speed decreases.

8. The method according to claim 4, wherein in order to achieve a setpoint temperature (Tsoll) derived from the setpoint operating signal (2_ss) according to step a), the time period (2_tp) between the zero passes is manipulated in such a way that in any case where an actual temperature (Tist) of the deflection unit (2) or of the motor vehicle light module (1) exceeds a setpoint temperature (Tsoll), the time period (2_tp_ist) between the zero position passes is increased.

9. The method according to claim 4, wherein in order to achieve a setpoint image sharpness (Csoll) derived from the setpoint operating signal (2_ss) according to step a), the amplitude (2_A_ist) of the deflection is manipulated in such a way that a maximum amplitude (2_Ay_max, 2_Az_max) is predetermined when maximum image sharpness is predetermined, and the amplitude (2_A_ist) is reduced as the setpoint image sharpness decreases.

10. The method according to claim 4, wherein in order to achieve a setpoint image sharpness (Csoll) derived from the setpoint operating signal (2_ss) according to step a), the amplitude (2_A_ist) of the deflection is manipulated in such a way that a maximum amplitude (2_A_max) is predetermined when maximum image sharpness is predetermined, and the amplitude (2_A_ist) is reduced as the setpoint image sharpness decreases and/or the temporal rate of change (2_dt_ist) of the deflection is manipulated in such a way that in any case where an actual image sharpness (Cist) of the deflection unit (2) falls below the setpoint image sharpness (Csoll), the temporal rate of change (2_dt_ist) of the deflection is increased.

11. The method according to claim 4, wherein in the sub-step II), an optimum deflection of the two low-resolution images (S_low1, S_low2) of the image pair (S_res) is also calculated in relation to one another as a function of the setpoint operating signal (2_ss).

12. The method according to claim 1, wherein in order to achieve a setpoint clarity (M_soll) of the deflection unit (2)

derived from the setpoint operating signal ($2\_ss$) according to step a), the temporal rate of change ($2\_dt$) of the deflection is manipulated in such a way that if a setpoint clarity (M_soll) is undershot, the temporal rate of change ($2\_dt$) of the deflection is at least temporarily increased.

13. The method according to claim 1, wherein the motor vehicle light module (1) is designed to emit light images that are different from one another with a frequency of at least 60 Hz, typically between 60 Hz and 160 Hz such that different setpoint images (Ssoll) with a frequency of at least 30 Hz are received and converted into individual low-resolution images (S_low1, S_low2) of the respective image pair (S_res) with a frequency of at least 60 Hz and emitted one after the other by the motor vehicle light module (1).

14. The method according to claim 1, wherein the deflection unit (2) comprises a glass plate (2a), which is pivotable or displaceable about at least one, preferably exactly one axis (y) or exactly two axes (y, z), wherein the glass plate (2a) preferably has a flat light entry surface (2a') and a light-emitting surface (2a") plane-parallel thereto, wherein the deflection unit (2) has at least one electrical coil (2b) for each axis about which the glass plate (2a) can be pivoted, wherein a means (2c) for magnetic coupling to the respective coil (2b) is arranged on the glass plate (2a) for each coil (2b) such that a force can be exerted on the associated means (2c) by energizing the respective coil (2b) in such a way that the glass plate (2a) is pivoted about the respective axis (y, z) as a function of the energizing of the coil (2b), wherein for each axis (y, z) about which the glass plate (2a) can be pivoted, the deflection unit (2) also preferably has a mechanical restoring element ( ) in particular a spring element ( ) for restoring the glass plate (2a) to a neutral position (Pn), which the glass plate (2a) automatically assumes in the event of a failure of a power supply to the deflection unit (2) or of a control variable ($2\_s$) provided for controlling the deflection unit (2).

15. A motor vehicle light module (1), wherein the motor vehicle light module (1) is designed to emit segmented light distribution, wherein the motor vehicle light module (1) comprises a deflection unit (2), with which a visually perceptible resolution of the light distribution produced by the motor vehicle light module (1) can be increased compared to the native resolution (An) of the motor vehicle light module (1), wherein the motor vehicle light module (1) is designed to implement the method according to claim 1.

* * * * *